United States Patent
Lee et al.

(10) Patent No.: US 10,594,534 B2
(45) Date of Patent: *Mar. 17, 2020

(54) COMMUNICATING SYNCHRONIZATION SIGNALS IN WIRELESS COMMUNICATIONS

(71) Applicant: QUALCOMM Incorporated, San Diego, CA (US)

(72) Inventors: Heechoon Lee, San Diego, CA (US); Tao Luo, San Diego, CA (US); Xiaoxia Zhang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,565

(22) Filed: Sep. 18, 2018

(65) Prior Publication Data

US 2019/0020523 A1 Jan. 17, 2019

Related U.S. Application Data

(63) Continuation of application No. 15/713,063, filed on Sep. 22, 2017, now Pat. No. 10,263,823.

(Continued)

(51) Int. Cl.
*H04W 24/02* (2009.01)
*H04L 27/26* (2006.01)
*H04W 56/00* (2009.01)
*H04B 7/06* (2006.01)
*H04W 72/04* (2009.01)

(Continued)

(52) U.S. Cl.
CPC ....... *H04L 27/2657* (2013.01); *H04B 7/0695* (2013.01); *H04L 27/2655* (2013.01); *H04W 56/0005* (2013.01); *H04W 56/0015* (2013.01); *H04W 72/046* (2013.01); *H04B 7/0617* (2013.01); *H04L 5/003* (2013.01); *H04L 5/005* (2013.01); *H04L 5/0026* (2013.01); *H04L 25/03866* (2013.01); *H04W 24/02* (2013.01)

(58) Field of Classification Search
CPC ............... H04L 27/2657; H04L 5/003; H04W 56/0005; H04W 24/02
See application file for complete search history.

(56) References Cited

U.S. PATENT DOCUMENTS 8,923,197 B2 12/2014 Pi et al.
2008/0247477 A1* 10/2008 Shen ..................... H04L 5/0019
375/260

(Continued)

OTHER PUBLICATIONS

International Search Report and Written Opinion—PCT/US2017/067552—ISA/EPO—dated Apr. 17, 2018.

*Primary Examiner* — Lan-Huong Truong
(74) *Attorney, Agent, or Firm* — Arent Fox, LLP

(57) ABSTRACT

Aspects of the present disclosure describe receiving synchronization signals in wireless communications. A block of synchronization signals can be received from a base station in a first time interval. A beam identifier and a redundancy version associated with the block of synchronization signals can be determined. A broadcast channel can be received based at least in part on a timing associated with the beam identifier. The broadcast channel can be descrambled based at least in part on a scrambling code associated with the redundancy version.

20 Claims, 8 Drawing Sheets

Related U.S. Application Data

(60) Provisional application No. 62/444,132, filed on Jan. 9, 2017.

(51) Int. Cl.
*H04L 5/00* (2006.01)
*H04L 25/03* (2006.01)

(56) References Cited

U.S. PATENT DOCUMENTS

| | | | |
|---|---|---|---|
| 2013/0064239 A1* | 3/2013 | Yu | H04W 72/046 370/350 |
| 2013/0121185 A1 | 5/2013 | Li et al. | |
| 2014/0064216 A1* | 3/2014 | Agiwal | H04L 1/0031 370/329 |
| 2014/0321375 A1* | 10/2014 | Agiwal | H04W 56/001 370/329 |
| 2016/0192341 A1 | 6/2016 | Park et al. | |
| 2016/0227575 A1 | 8/2016 | Furuskog et al. | |
| 2017/0034812 A1 | 2/2017 | Deng et al. | |
| 2017/0339675 A1 | 11/2017 | Liu et al. | |
| 2018/0198664 A1 | 7/2018 | Lee et al. | |

* cited by examiner

COMMUNICATING SYNCHRONIZATION SIGNALS IN WIRELESS COMMUNICATIONS

CLAIM OF PRIORITY UNDER 35 U.S.C. § 119

The present application for patent is a continuation of application Ser. No. 15/713,063, entitled "COMMUNICATING SYNCHRONIZATION SIGNALS IN WIRELESS COMMUNICATIONS" filed Sep. 22, 2017, which claims priority to Provisional Application No. 62/444,132, entitled "COMMUNICATING SYNCHRONIZATION SIGNALS IN WIRELESS COMMUNICATIONS" filed Jan. 9, 2017, which are assigned to the assignee hereof and hereby expressly incorporated by reference herein for all purposes.

BACKGROUND

Aspects of the present disclosure relate generally to wireless communication systems, and more particularly, to communicating synchronization signals in a wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In multiple types of wireless networks, base stations can transmit synchronization signals to one or more user equipment (UE) to allow for time/frequency synchronization and/or cell identifier detection. In LTE, for example, base stations can transmit a primary synchronization signal (PSS) and/or a secondary synchronization signal (SSS). A physical broadcast channel (PBCH) may also be transmitted to provide the UE with system information, such as a master information block (MIB) for obtaining minimum system information block (SIB) delivered in physical downlink control channel (PDCCH)/physical downlink shared channel (PDSCH).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of receiving synchronization signals in wireless communications is provided. The method includes receiving a block of synchronization signals from a base station in a first time interval, determining a beam identifier and a redundancy version associated with the block of synchronization signals, receiving a broadcast channel based at least in part on a timing associated with the beam identifier, and descrambling the broadcast channel based at least in part on a scrambling code associated with the redundancy version.

In another example, an apparatus for receiving synchronization signals in wireless communications is provided. The apparatus includes a transceiver for communicating one or more wireless signals via one or more antennas, a memory configured to store instructions, and one or more processors communicatively coupled with the transceiver and the memory. The one or more processors are configured to receive a block of synchronization signals from a base station in a first time interval, determine a beam identifier and a redundancy version associated with the block of synchronization signals, receive a broadcast channel based at least in part on a timing associated with the beam identifier, and descramble the broadcast channel based at least in part on a scrambling code associated with the redundancy version.

In another example, an apparatus for receiving synchronization signals in wireless communications is provided that includes means for receiving a block of synchronization signals from a base station in a first time interval, means for determining a beam identifier and a redundancy version associated with the block of synchronization signals, means for receiving a broadcast channel based at least in part on a timing associated with the beam identifier, and means for descrambling the broadcast channel based at least in part on a scrambling code associated with the redundancy version.

In another example, a computer-readable medium, including code executable by one or more processors for receiving synchronization signals in wireless communications. The code includes code for receiving a block of synchronization signals from a base station in a first time interval, code for determining a beam identifier and a redundancy version associated with the block of synchronization signals, code for receiving a broadcast channel based at least in part on a timing associated with the beam identifier, and code for descrambling the broadcast channel based at least in part on a scrambling code associated with the redundancy version.

In another example, a method for transmitting synchronization signals in wireless communications is provided. The method includes scrambling a broadcast channel using a scrambling code associated with a redundancy version, beamforming multiple signals, each including the broadcast channel and additional synchronization signals, based on an associated beam identifier, and transmitting each of the multiple signals as a beamformed signal in a different time period based on the associated beam identifier.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
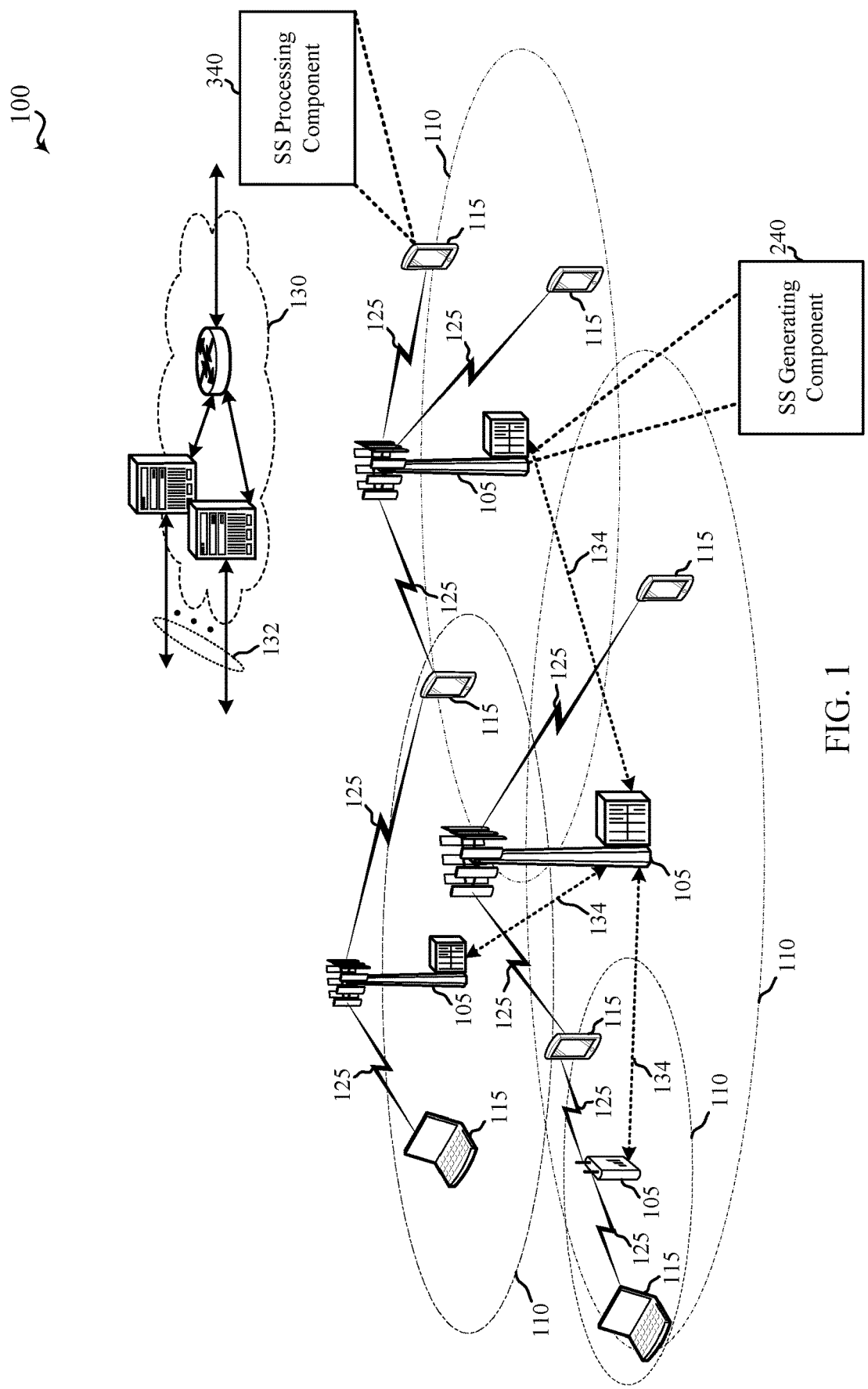
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transmitting synchronization signals in one or multiple beams. For example, a fifth generation wireless communications technology (which can be referred to as 5G new radio (5G NR)) or other wireless communications technologies may employ base stations that utilize one or multiple beams in transmitting communications to one or more user equipment (UE). For example, the base station may transmit multiple beams in multiple directions (e.g., as time division duplexed (TDD) over different periods of time) to improve detection of corresponding signals and/or related channels by one or more UEs. In addition, the base station may transmit multiple synchronization signals, each of which can have an associated redundancy version, to improve likelihood of detection of the synchronization signals by the UE. Moreover, in an example, the base station may transmit various synchronization signals (e.g., primary synchronization signal (PSS), secondary synchronization signal (SSS), physical broadcast channel (PBCH), demodulation reference signal (RS) for demodulation PBCH, etc.) in a synchronization signal (SS) block. In a specific example, the wireless communication technology (e.g., 5G NR) air interface may target unified synchronization/PBCH design for multi-beam/single-beam design, and base stations may accordingly transmit the multiple beams individually and/or with each base station transmitting one of the multiple beams.

Accordingly, in an example, the base station(s) can transmit one SS block per one or more multiple beams and per redundancy version (RV). For instance, the base station(s) can transmit each SS block in a TDD manner such that a SS block for a first beam and first RV is sent in a first time period, the same SS block for a second beam and first RV is sent in a second time period, and so on until the first RV for each of the beams are sent, and then the base station can transmit the SS block for the first beam and a second RV, followed by the same SS block for the second beam and second RV, etc. In another example, the base station(s) can transmit each SS block in a TDD manner such that a SS block for a first beam and first RV is sent in a first time period, the same SS block for the first beam and a second RV is sent in a second time period, and so on until each of the RVs for the first beams are sent, and then the base station can transmit the SS block for the second beam and a first RV, followed by the SS block for the second beam and the second RV, etc. Moreover, for example, the base station(s) can utilize the same scrambling code for each beam regardless of RV, and a different scrambling code for each RV regardless of beam (e.g., a contiguous scrambling code across RVs). In any case, the UE can receive the SS blocks for one or more beams and/or RVs, combine the SS blocks, and decode corresponding broadcast channels based on a determined beam identifier and/or RV of the SS blocks. In one example, a UE can receive and decode one or more of the beams from the base station(s) to acquire timing synchronization and/or other acquisition information for accessing the network via the base station(s).

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, a base station 105 may transmit signals using multiple beams transmitted using TDD, where each beam can be transmitted in a direction (e.g., around an intended coverage area) to improve detectability by one or more UEs 115. In an example, the base station 105 may include a SS generating component 240 for generating one or more synchronization signals or SS blocks for transmitting to one or more UEs using one or more beams and/or one or more redundancy versions (RVs). In one example, multiple base stations 105 can each transmit a beam (e.g., and/or can transmit multiple instances of the beam using different redundancy versions) in a unified design to transmit multiple beams. The one or more UEs 115 can also include a processing component 340 for receiving the one or more synchronization signals or SS blocks in one or more signals from the base station(s) 105 (e.g., as corresponding to one or more beams and/or RVs) and appropriately descrambling, combining, and/or processing the signals.

Figure 2:
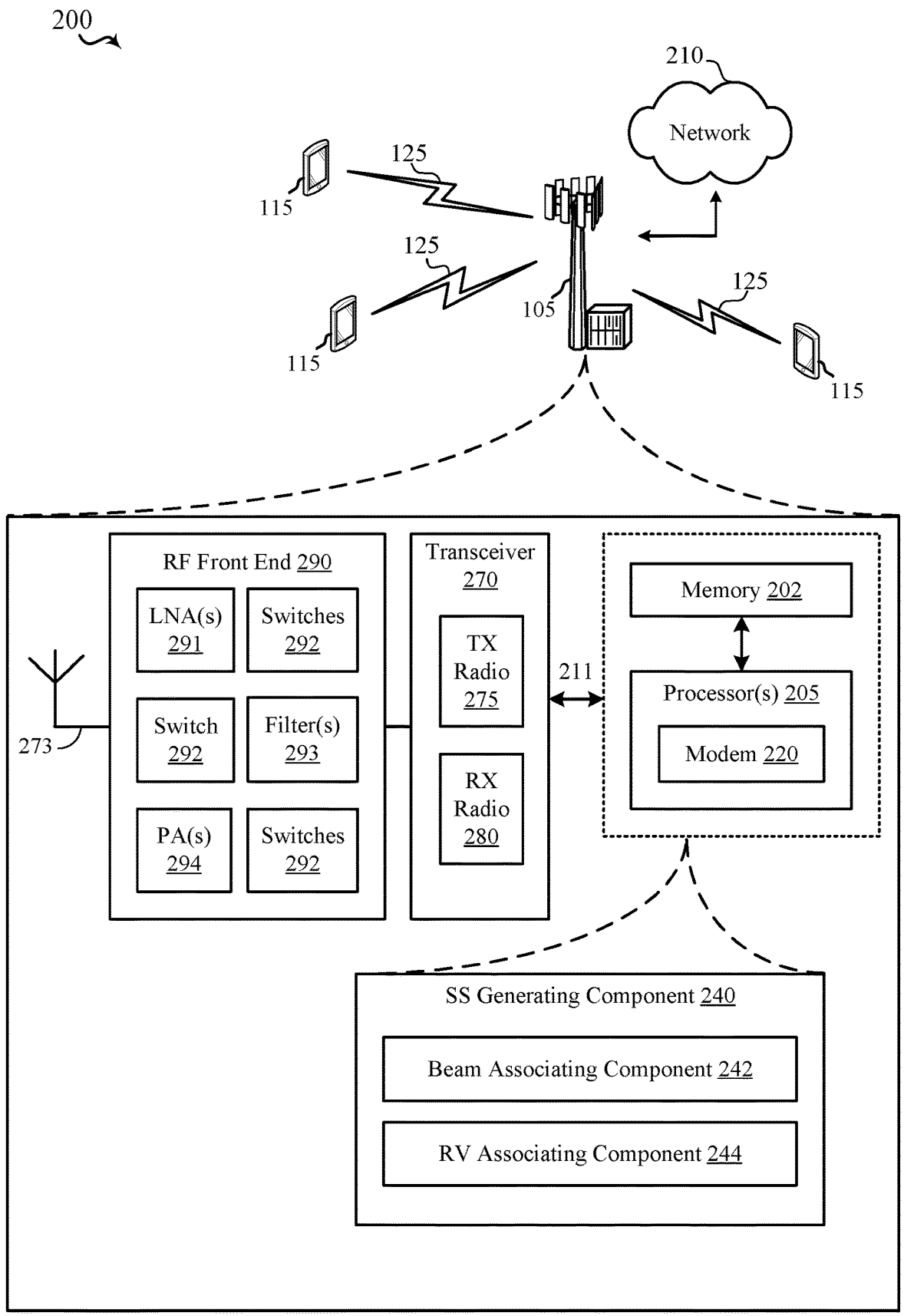
FIG. 2 is a block diagram illustrating an example of a base station, in accordance with various aspects of the present disclosure.
Figure 3:
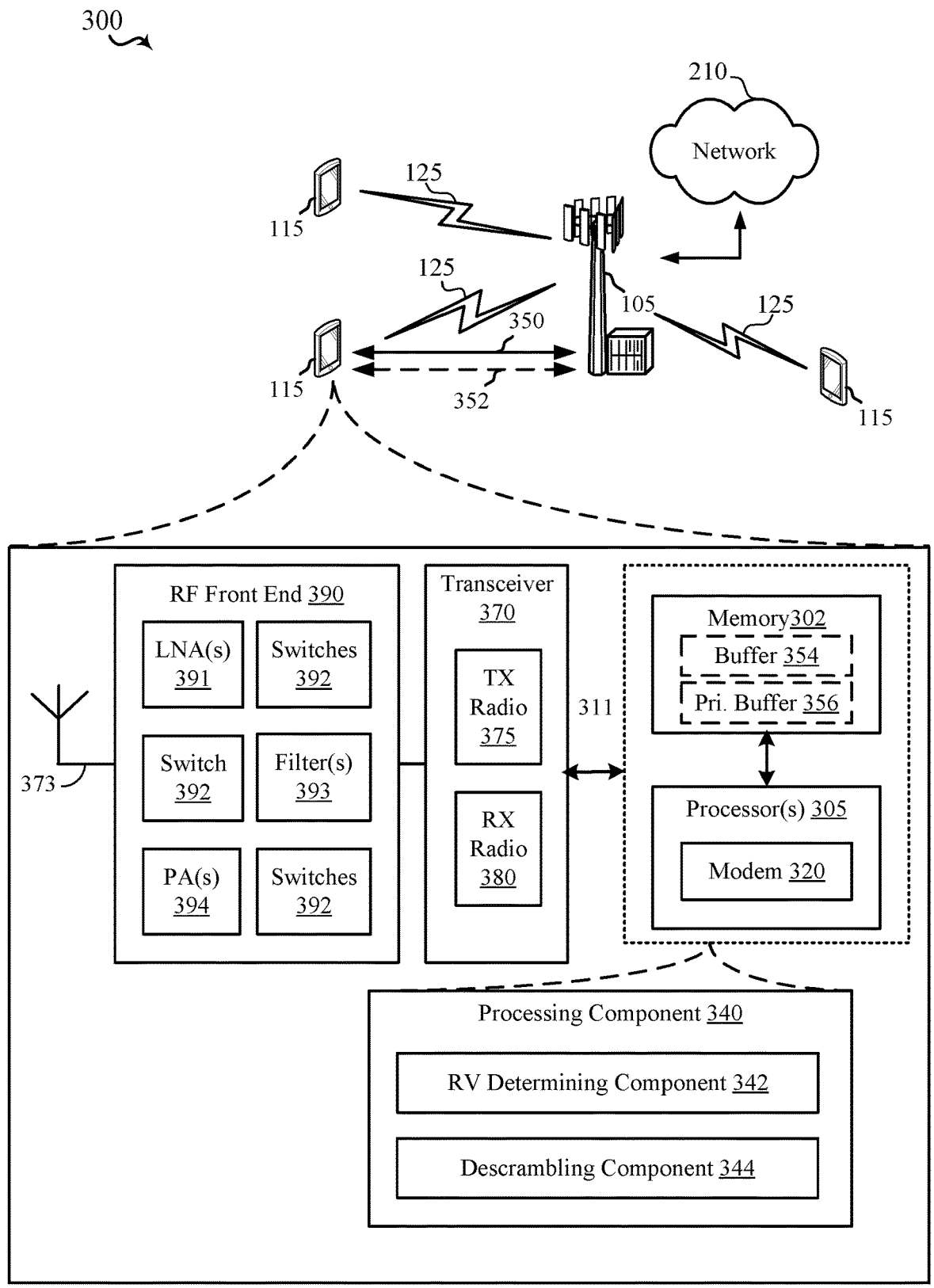
FIG. 3 is a block diagram illustrating an example of a UE, in accordance with various aspects of the present disclosure.
Figure 4:
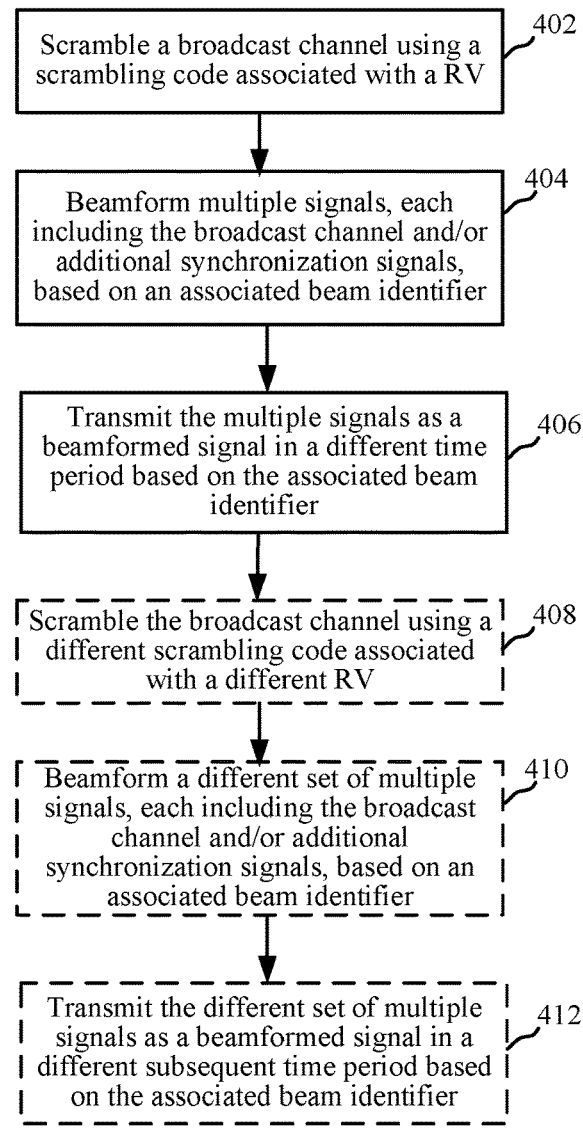
FIG. 4 is a flow chart illustrating an example of a method for transmitting synchronization signal (SS) blocks, in accordance with various aspects of the present disclosure.
Figure 5:
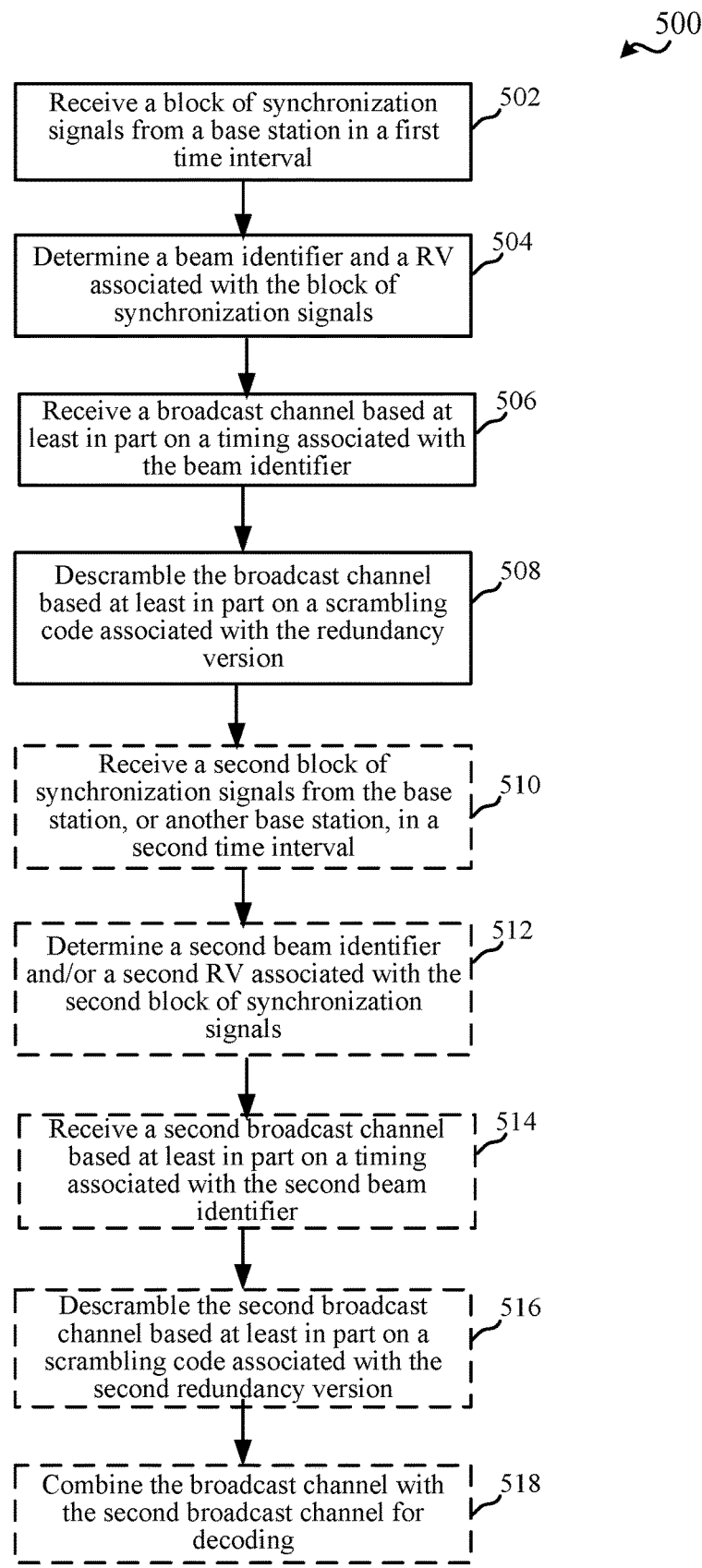
FIG. 5 is a flow chart illustrating an example of a method for receiving SS blocks, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive and processing synchronization signals and/or SS blocks in multiple signals from one or more base stations 105. Moreover the base station 105 may be an example of the base stations described in the present disclosure (e.g., eNB, gNB, etc. providing one or more macrocells, small cells, etc.) that are configured to transmit synchronization signals and/or SS blocks in multiple instances related to a certain beam and/or RV.

In an aspect, the base station in FIG. 2 may include one or more processors 205 and/or memory 202 that may operate in combination with a SS generating component 240 to perform the functions, methodologies (e.g., method 400 of FIG. 4), or methods presented in the present disclosure. In accordance with the present disclosure, the SS generating component 240 may include a beam associating component 242 for associating a SS block with a beam for transmitting to one or more UEs, and/or a RV associating component 244 for associating the SS block with a RV. For example, the base station 105 may coordinate transmitting of the SS block with one or more other base stations 105 that may operate together to provide a cell for accessing by the UE 115. In an example, the base stations 105 may coordinate, e.g., via SS generating component 240, transmitting of the SS block in multiple directional beams to expand coverage of the cell to various UEs 115.

The one or more processors 205 may include a modem 220 that uses one or more modem processors. The various functions related to the SS generating component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the SS generating component 240. In another example, SS generating component 240 may operate at one or more communication layers, such as a PDCP layer, an RLC layer, etc., to process packets or related PDUs received over the one or more communication layers.

In some examples, the SS generating component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the SS generating component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or SS generating component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining SS generating component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 7. Similarly, the memory 202 may correspond to the memory described in connection with the base station in FIG. 7.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive and processing synchronization signals and/or SS blocks in multiple signals from one or more base stations 105. Moreover the base station 105 may be an example of the base stations described in the present disclosure (e.g., eNB, gNB, etc. providing one or more macrocells, small cells, etc.) that are configured to transmit synchronization signals and/or SS blocks in multiple instances related to a certain beam and/or RV.

In an aspect, the UE 115 in FIG. 3 may include one or more processors 305 and/or memory 302 that may operate in combination with a processing component 340 to perform the functions, methodologies (e.g., method 500 of FIG. 5), or methods presented in the present disclosure, which may include receiving an SS block from one or more base stations 105 that provide a cell accessible for communicating with a wireless network. In accordance with the present disclosure, the processing component 340 may include, or may be communicatively coupled with, a RV determining component 342 configured for determining a RV associated with a received SS block, and/or a descrambling component 344 for decoding a broadcast channel transmitted by the base station 105 based on the SS block.

The one or more processors 305 may include a modem 320 that uses one or more modem processors. The various functions related to the processing component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the processing component 340. In another example, processing component 340 may operate at one or more communication layers, such as a PDCP layer, an RLC layer, etc., to process and/or prioritize packets or generate related PDUs over the one or more communication layers.

In some examples, the processing component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets (e.g., and/or one or more related PDUs) as received by the processing component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or processing component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining processing component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 7. Similarly, the memory 302 may correspond to the memory described in connection with the UE in FIG. 7.

FIG. 4 illustrates a flow chart of an example of a method 400 for transmitting (e.g., by a base station) a SS block for one or more beams and/or redundancy versions.

At Block 402, the base station can scramble a broadcast channel using a scrambling code associated with a RV. In an aspect, RV associating component 244, e.g., in conjunction with processor(s) 205, memory 202, and/or SS generating component 240, can scramble the broadcast channel using the scrambling code associated with the RV. For example, SS generating component 240 can generate synchronization signals (e.g., an SS block) for broadcasting in a wireless network. As described, the SS block may include a PSS, SSS, PBCH, RS for demodulating PBCH, etc. In this example, RV associating component 244 can associate the SS block, or at least a broadcast channel thereof (e.g., PBCH), with a RV by scrambling the SS block and/or broadcast channel with a scrambling code corresponding to the RV. In addition, for example, RV associating component 244 may indicate the RV in the SS block. Moreover, for example, the RV associating component 244 can scramble the broadcast channel based on applying a corresponding scrambling code to the channel (e.g., after channelization) before providing the scrambled channel for modulation (e.g., by RF front end 290, transmit modulator 832, 833 in FIG. 8, etc.) and transmission (e.g., over antenna 273, antenna 834, 835, etc.), as described herein. In an example, applying the scrambling code may include multiplying a channel matrix representative of the channel by the scrambling code, which can include a number, vector, or another matrix, and can be associated with the specific redundancy version.

At Block 404, the base station can beamform multiple signals, each including the broadcast channel and/or additional synchronization signals based on an associated beam identifier. In an aspect, beam associating component 242, e.g., in conjunction with processor(s) 205, memory 202, and/or SS generating component 240, can beamform the multiple signals, each including the broadcast channel and/or additional synchronization signals, based on the associated beam identifier. For example, beam associating component 242 can associate the signals with the beam by including a beam identifier in the signals, beamforming the signals to a direction corresponding to the beam identifier, etc. Moreover, SS generating component 240 can coordinate transmission of multiple beams with other base stations, as described, and beam associating component 242 can beamform the signals based on coordination with the other base stations.

At Block 406, the base station can transmit each of the multiple signals as a beamformed signal in a different time period based on the associated beam identifier. In an aspect, SS generating component 240, e.g., in conjunction with processor(s) 205, memory 202, transceiver 270, etc. can transmit each of the multiple signals as a beamformed signal in a different time period based on the associated beam identifier. For example, SS generating component 240 can transmit one beamformed signal associated with a beam identifier in a first time interval (e.g., transmission time interval (TTI)), and can transmit another beamformed signal associated with another beam identifier in a second time interval that can be adjacent or non-adjacent to the first time interval.

At Block 408, the base station can optionally scramble the broadcast channel using a different scrambling code associated with a different RV. In an aspect, RV associating component 244, e.g., in conjunction with processor(s) 205, memory 202, and/or SS generating component 240, can scramble the broadcast channel using the different scrambling code associated with the different RV. For example, SS generating component 240 can associate the same SS block, or at least the broadcast channel thereof (e.g., PBCH), with the different RV by scrambling the SS block and/or broadcast channel with the different scrambling code corresponding to the different RV. For example, each RV can be associated with a different scrambling code, which may be contiguous (e.g., in a configured sequence of scrambling codes) or non-contiguous from a scrambling code used for a previous RV. In an example, the wireless communication technology can define a sequence of scrambling codes that can be used to scramble signals, and contiguous codes can refer to codes that are adjacent in index or position in the defined sequence. In addition, for example, RV associating component 244 may indicate the different RV in the SS block.

At Block 410, the base station can optionally beamform a different set of multiple signals, each including the broadcast channel and/or additional synchronization signals based on an associated beam identifier. In an aspect, beam associating component 242, e.g., in conjunction with processor(s) 205, memory 202, and/or SS generating component 240, can beamform the different set of multiple signals, each including the broadcast channel and/or additional synchronization signals, based on the associated beam identifier. As described, for example, beam associating component 242 can associate the different set of multiple signals with the beam by including a beam identifier in the signals, beamforming the signals to a direction corresponding to the beam identifier, etc. Moreover, beam associating component 242 can beamform the different set of multiple signals based on coordination with the other base stations, as described.

At Block 412, the base station can optionally transmit the different set of multiple signals as a beamformed signal in a different subsequent time period based on the associated beam identifier. In an aspect, SS generating component 240, e.g., in conjunction with processor(s) 205, memory 202, transceiver 270, etc. can transmit the different set of multiple signals as a beamformed signal in the different subsequent time period based on the associated beam identifier. For example, SS generating component 240 can transmit one of the different beamformed signals (scrambled based on the different RV) associated with a beam identifier in a first time interval, and can transmit another different beamformed signal (scrambled based on the different RV) associated with another beam identifier in a second time interval that can be adjacent or non-adjacent in time to the first time interval (e.g., in an adjacent or non-adjacent TTI).

In a specific example, in this regard, SS generating component 240 may transmit the SS blocks using TDD and such that SS blocks associated with a first RV are transmitted for each of the corresponding beam identifiers before transmitting SS blocks associated with the second RV, and so on. Thus, for example, the SS generating component 240 can transmit the SS block first over multiple beams, which can be transmitted in multiple directions to provide expanded cell coverage, and then repeated over different RVs (e.g., in contiguous or non-contiguous TTIs). In one example, SS generating component 240 may generate and transmit the SS block over one beam while other base stations cooperating to provide the cell can transmit the SS block over the other beams to form the multiple beams.

In another specific example, SS generating component 240 may transmit the SS blocks associated with a first beam identifier for each of the corresponding RVs before transmitting SS blocks associated with the next beam identifier. Thus, for example, the SS generating component 240 can transmit the SS block first repeated over different RVs per beam and then over the multiple beams (e.g., in contiguous or non-contiguous TTIs). In another example, other base stations cooperating to provide the cell can transmit the SS block over the other multiple beams (e.g., repeated for each of the multiple RVs). In either case, for example, the same scrambling code can be used for PBCH in each beam, and different (e.g., contiguous) scrambling codes can be used for PCHS over transmission with different RVs. In addition, for example, the same set of SS blocks can be repeatedly transmitted every K TTIs, where K can be a MIB repetition periodicity. Moreover, the scrambling code can be initialized every K TTI boundary.

Figure 6:
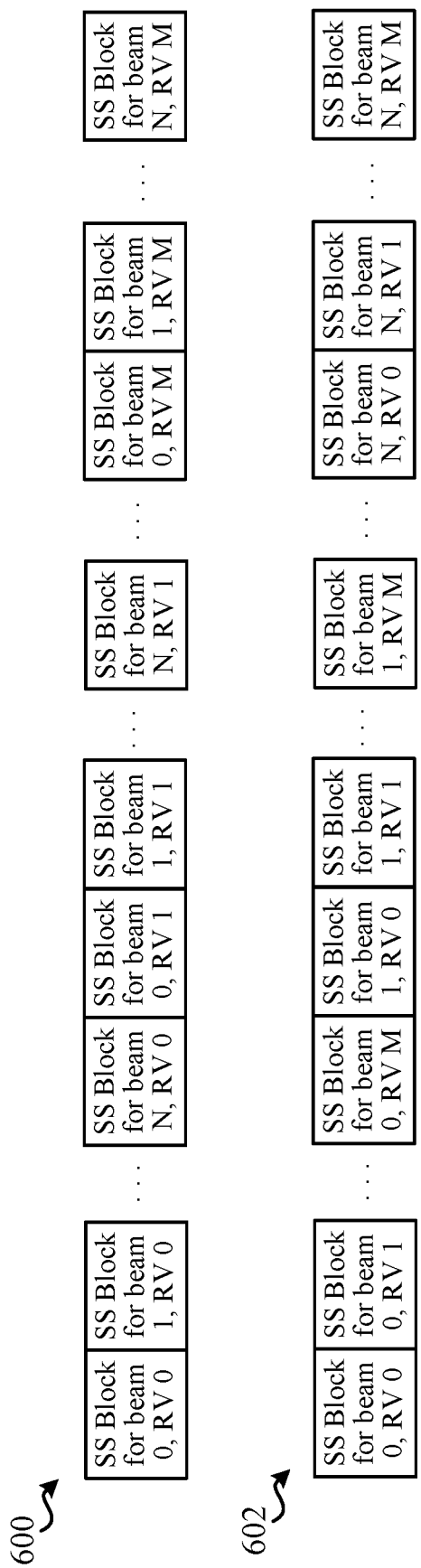
FIG. 6 is a block diagram illustrating examples of timelines, in accordance with various aspects of the present disclosure.

An example is shown in FIG. 6, which illustrates examples of timelines 600, 602 of TTIs over which SS blocks are transmitted. In timeline 600, SS blocks are transmitted for a given RV first, such that SS blocks are transmitted for each beam identifier 0 to N for RV 0, and then SS block are transmitted for each beam identifier 0 to N for RV 1, and so on to RV M, where N and M are positive integers. In timeline 602, SS blocks are transmitted for a given beam identifier first, such that SS blocks are transmitted for each RV 0 to M for beam identifier 0, and then SS block are transmitted for each RV 0 to M for beam identifier 1, and so on to beam identifier N. The concepts can be applied to substantially any number of beam identifiers (e.g., one or more beam identifiers) and RVs (e.g., one or more RVs). Furthermore, though shown in contiguous TTIs, in some examples the SS blocks can be transmitted in non-contiguous TTIs. Moreover, in an example, the SS blocks can be transmitted according to a pattern of continuous or non-contiguous TTIs (e.g., SS blocks of the same RV can be contiguous while SS blocks for a different RV may or may not be contiguous to a previous RV SS block, SS blocks of the same beam identifier can be contiguous while SS blocks for a different beam identifier may or may not be contiguous to a previous beam identifier SS block). Additionally, different base stations can transmit different ones of the beams, in one example, where the different base stations coordinate to provide a particular cell.

Figure 7:
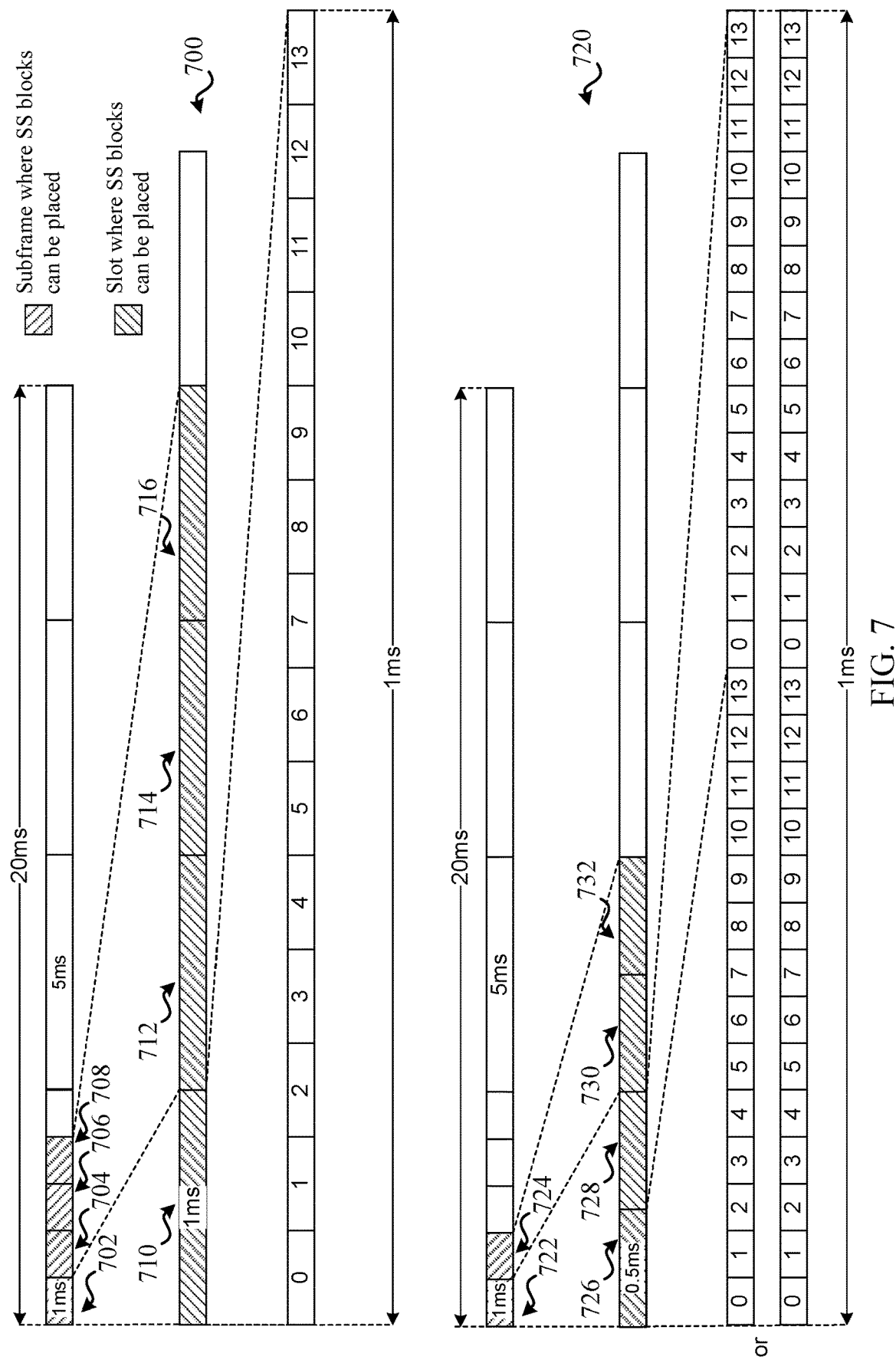
FIG. 7 is a block diagram illustrating examples of slot and subframe timelines, in accordance with various aspects of the present disclosure.

Another example is shown in FIG. 7, which illustrates examples of timelines 700, 720 of subframes and/or slots over which SS blocks can be transmitted. In timeline 700, SS blocks, whether by RV first or beam identifier first, as described above, can be transmitted in one or more of 1 ms subframes 702, 704, 706, 708, which may correspond to 1 ms slots 710, 712, 714, 716, respectively, and where each slot may include 14 symbols (symbols 0-13). In timeline 720, SS blocks, whether by RV first or beam identifier first, as described above, can be transmitted in one or more of 1 ms subframes 722, 724, and/or in one or more corresponding 0.5 ms slots 726, 728, 730, 732, respectively, and where each slot may include 14 symbols (symbols 0-13). For example, the SS blocks may be transmitted in contiguous (e.g., adjacent in time) subframes, 702, 704, 706, 708, contiguous slots 710, 712, 714, 716, contiguous slots 726, 728, 730, 732, etc. In another example, the SS blocks may be transmitted in non-contiguous (e.g., not adjacent in time) subframes selected from the group of subframes 702, 704, 706, 708, non-contiguous slots selected from the group of slots 710, 712, 714, 716, non-contiguous slots selected from the group of slots 726, 728, 730, 732, etc.

FIG. 5 illustrates a flow chart of an example of a method 500 for processing (e.g., by a UE) a block of synchronization signals received from one or more base stations.

In method 500, at Block 502, the UE can receive a block of synchronization signals from a base station in a first time interval. In an aspect, processing component 340, e.g., in conjunction with processor(s) 305, memory 302, and/or transceiver 370, can receive the block of synchronization signals from the base station (e.g., base station 105) in the first time interval (e.g., TTI). Processing component 340, for example, may receive one of multiple SS blocks transmitted by the base station 105, and/or other base stations coordinating to provide a cell, depending on the UE 115 location with respect to the base station(s), radio conditions, etc. Thus for example, processing component 340 may receive the SS block relating to one of multiple possible beam identifiers and/or RVs.

At Block 504, the UE can determine a beam identifier and a RV associated with the block of synchronization signals. In an aspect, RV determining component 342, e.g., in conjunction with processor(s) 305, memory 302, and/or processing component 340, can determine the beam identifier and the RV associated with the block of synchronization signals. In one example, the SS block may indicate the beam identifier and/or RV, and the RV determining component 342 may accordingly determine the beam identifier and/or RV based on information in the SS block. In another example, RV determining component 342 may determine an RV based at least in part on determining a scrambling code used to descramble the broadcast channel in the SS block. For example, RV determining component 342 may attempt to descramble the broadcast channel using multiple scrambling code hypotheses to determine which scrambling code relates to the broadcast channel, and can accordingly determine the RV (e.g., based on a configured mapping of scrambling codes to RVs). In an example, RV determining component 342 can provide the determined RV to the processing component 340, descrambling component 344, etc., for use in descrambling or otherwise processing the broadcast channel.

At Block 506, the UE can receive a broadcast channel based at least in part on a timing associated with the beam identifier. In an aspect, processing component 340, e.g., in conjunction with processor(s) 305, memory 302, etc., can receive the broadcast channel based at least in part on the timing associated with the beam identifier. For example, processing component 340 may receive the broadcast channel, from the one or more base stations 105, as part of the SS block or in a subsequent transmission (e.g., over a PDCCH/PDSCH) based on a timing of the SS block (e.g., an offset of the timing of the SS block). Moreover, for example, processing component 340 can determine the timing based on the synchronization signals received from the base station in the first time interval and/or as otherwise known or determined from the associated beam identifier.

At Block 508, the UE can descramble the broadcast channel based at least in part on a scrambling code associated with the redundancy version. In an aspect, descrambling component 344, e.g., in conjunction with processor(s) 305, memory 302, and/or processing component 340, can descramble the broadcast channel based at least in part on the scrambling code associated with the RV. For example, descrambling component 344 can determine the scrambling code for descrambling the broadcast channel based on an RV indicated in the SS block (e.g., the RV as received from the RV determining component 342). In another example, descrambling component 344 can use multiple scrambling code hypotheses in attempting to descramble the broadcast channel, and may determine the RV based on the scrambling code that allows for successfully descrambling the broadcast channel. In any case, the base station 105 and UE 115 may store or otherwise be configured with a mapping of RV to scrambling code for scrambling/descrambling the broadcast channel, specifying/determining the RV based on the scrambling of the broadcast channel, etc. Moreover, for example, the processing component 340 can descramble the broadcast channel based on applying a corresponding scrambling code to the channel after reception (e.g., over antenna 373, antenna 852, 853 in FIG. 8, etc.) and demodulation (e.g., by RF front end 390, receive demodulator 854, 855, etc.), as described herein. In an example, descrambling may include attempting to apply a descrambling code corresponding to one or more scrambling codes, which may include multiplying a channel matrix representative of the scrambled channel by the descrambling code, which can include a number, vector, or another matrix, and can be associated with the specific redundancy version.

At Block 510, the UE can optionally receive a second block of synchronization signals from the base station, or another base station, in a second time interval. In an aspect, processing component 340, e.g., in conjunction with processor(s) 305, memory 302, and/or transceiver 370, can receive the second block of synchronization signals from the base station (e.g., base station 105), or another base station, in the second time interval (e.g., TTI). As described, processing component 340, for example, may receive one of a plurality of SS blocks transmitted by the base station 105, or another base station, depending on the UE 115 location with respect to the base station(s), radio conditions, etc. Thus, for example, processing component 340 may receive the second SS block as a different RV related to the same beam identifier, or a SS block related to a different beam identifier altogether, etc.

At Block 512, the UE can optionally determine a second beam identifier and/or a second RV associated with the second block of synchronization signals. In an aspect, RV determining component 342, e.g., in conjunction with processor(s) 305, memory 302, and/or processing component 340, can determine the second beam identifier and/or the second RV associated with the second block of synchronization signals. In one example, the second SS block may indicate the second beam identifier and/or second RV, and the RV determining component 342 may accordingly determine the second beam identifier and/or second RV based on information in the second SS block. In another example, RV determining component 342 may determine a second RV based at least in part on determining a scrambling code used to descramble the broadcast channel in the second SS block. In any case, the second beam identifier may the same or different from the beam identifier, and/or the second RV may be the same or different from the RV.

At Block 514, the UE can optionally receive a second broadcast channel based at least in part on a timing associated with the second beam identifier. In an aspect, processing component 340, e.g., in conjunction with processor(s) 305, memory 302, etc., can receive the second broadcast channel based at least in part on the timing associated with the second beam identifier. As described, for example, processing component 340 may receive the second broadcast channel, e.g., from the one or more base stations, as part of the second SS block or in a subsequent transmission (e.g., over a PDCCH/PDSCH) based on a timing of the second SS block (e.g., an offset of the timing of the second SS block).

At Block 516, the UE can optionally descramble the second broadcast channel based at least in part on a scrambling code associated with the second redundancy version. In an aspect, descrambling component 344, e.g., in conjunction with processor(s) 305, memory 302, and/or processing component 340, can descramble the second broadcast channel based at least in part on the scrambling code associated with the second RV. For example, descrambling component 344 can determine the scrambling code for descrambling the broadcast channel based on the second RV, which may be indicated in the SS block (e.g., the RV as received from the RV determining component 342). In another example, descrambling component 344 can use multiple scrambling code hypotheses in attempting to descramble the broadcast channel, and may determine the second RV based on the scrambling code that allows for successfully descrambling the broadcast channel.

At Block 518, the UE can optionally combine the broadcast channel with the second broadcast channel for decoding. In an aspect, processing component 340, e.g., in conjunction with processor(s) 305, memory 302, etc., can combine the broadcast channel with the second broadcast channel for decoding. Receiving and combining the broadcast channel from multiple signals in this regard may improve the decoding result. In addition, the UE 115 can process the contents of the broadcast channel (e.g., PBCH) to receive information related to communicating with the base station 105 (e.g., MIB, minimum system information block (MSIB), etc.). In an example, processing component 340 can combine multiple broadcast channels corresponding to SS blocks across different beam identifiers and/or different associated RVs. In any case, for example, the UE 115 can attempt to establish a connection with the base station 105 by transmitting one or more signals over an access channel based on information at least partially received in the broadcast channel.

Figure 8:
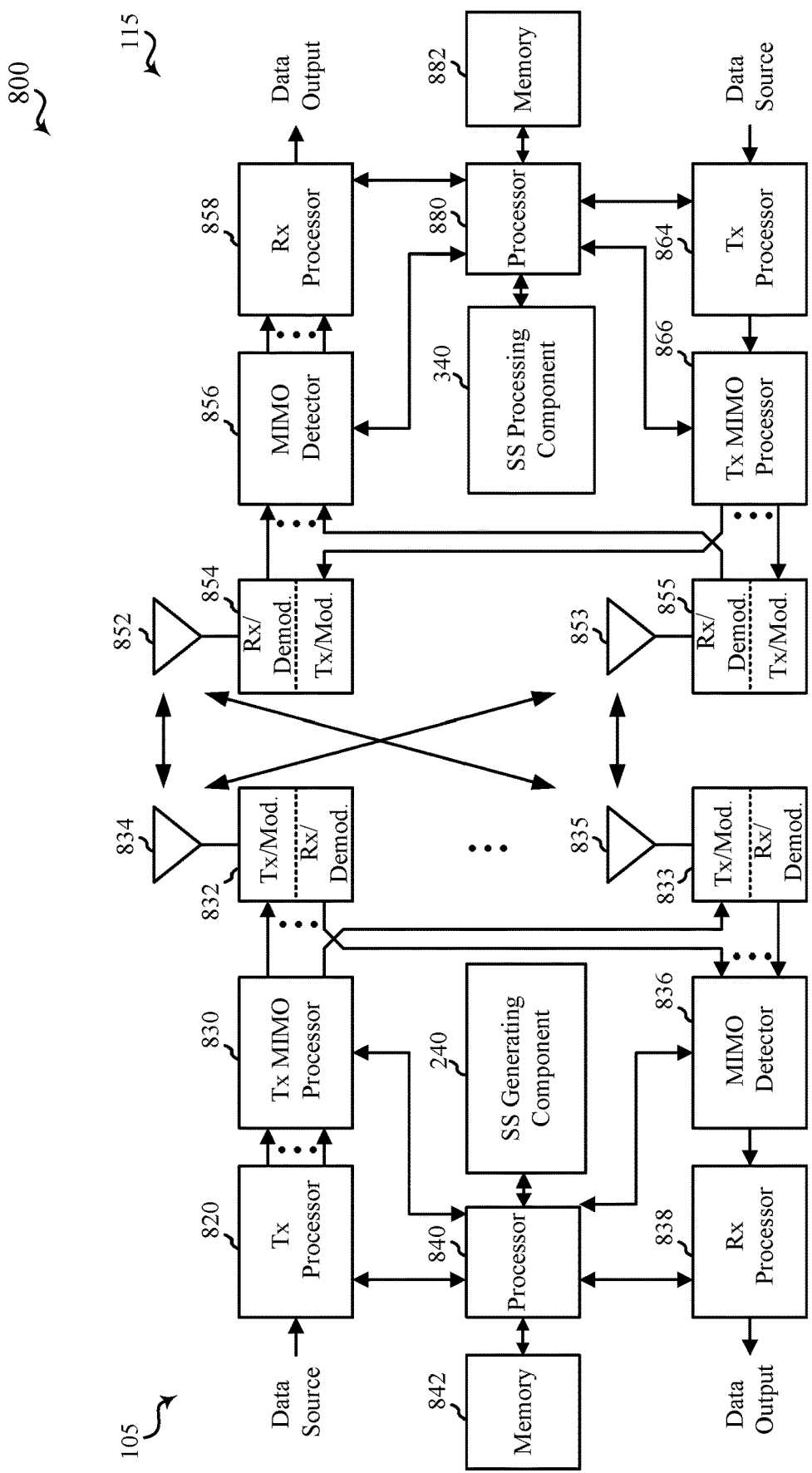
FIG. 8 is a block diagram illustrating an example of a MIMO communication system including a base station and a UE, in accordance with various aspects of the present disclosure.

FIG. 8 is a block diagram of a MIMO communication system 800 including a base station 105 and a UE 115. The MIMO communication system 800 may illustrate aspects of the wireless communication system 100 described with reference to FIG. 1. The base station 105 may be an example of aspects of the base station 105 described with reference to FIGS. 1, 2, and 3. The base station 105 may be equipped with antennas 834 and 835, and the UE 115 may be equipped with antennas 852 and 853. In the MIMO communication system 800, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 115 may be an example of aspects of the UEs 115 described with reference to FIGS. 1, 2, and 3. At the UE 115, the UE antennas 852 and 853 may receive the DL signals from the base station 105 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 115 to a data output, and provide decoded control information to a processor 880, or memory 882.

The processor 880 may in some cases execute stored instructions to instantiate a processing component 340 (see e.g., FIGS. 1 and 3).

On the uplink (UL), at the UE 115, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 105 in accordance with the communication parameters received from the base station 105. At the base station 105, the UL signals from the UE 115 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a SS generating component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for receiving synchronization signals in wireless communications, comprising:
   receiving a block of synchronization signals from a base station in a first time interval;
   determining a beam identifier and a redundancy version associated with the block of synchronization signals;
   receiving a broadcast channel based at least in part on a timing associated with the beam identifier;
   descrambling the broadcast channel based at least in part on a scrambling code associated with the redundancy version; and
   receiving a second block of synchronization signals from the base station in a second time interval, wherein the second block of synchronization signals corresponds to a different redundancy version and the beam identifier.

2. The method of claim 1, wherein the second time interval is adjacent in time to the first time interval.

3. The method of claim 1, wherein the second time interval is not adjacent in time to the first time interval.

4. The method of claim 1, further comprising:
   receiving a second instance of the broadcast channel based at least in part on a second timing associated with the beam identifier;
   descrambling the second instance of the broadcast channel based at least in part on the different redundancy version; and
   combining the second instance of the broadcast channel with the broadcast channel to obtain associated broadcast channel data.

5. The method of claim 4, wherein a second scrambling code used to descramble the second instance of the broadcast channel is contiguous in a sequence of scrambling codes to a first scrambling code used to descramble the broadcast channel.

6. An apparatus for receiving synchronization signals in wireless communications, comprising:
   a transceiver for communicating one or more wireless signals via one or more antennas;
   a memory configured to store instructions; and
   one or more processors communicatively coupled with the transceiver and the memory, wherein the one or more processors are configured to:
   receive a block of synchronization signals from a base station in a first time interval;
   determine a beam identifier and a redundancy version associated with the block of synchronization signals;
   receive a broadcast channel based at least in part on a timing associated with the beam identifier;
   descramble the broadcast channel based at least in part on a scrambling code associated with the redundancy version; and
   receive a second block of synchronization signals from the base station in a second time interval, wherein the second block of synchronization signals corresponds to a different redundancy version and the beam identifier.

7. The apparatus of claim 6, wherein the second time interval is adjacent in time to the first time interval.

8. The apparatus of claim 6, wherein the second time interval is not adjacent in time to the first time interval.

9. The apparatus of claim 6, wherein the one or more processors are further configured to:
   receive a second instance of the broadcast channel based at least in part on a second timing associated with the beam identifier;
   descramble the second instance of the broadcast channel based at least in part on the different redundancy version; and
   combine the second instance of the broadcast channel with the broadcast channel to obtain associated broadcast channel data.

10. The apparatus of claim 9, wherein a second scrambling code used to descramble the second instance of the broadcast channel is contiguous in a sequence of scrambling codes to a first scrambling code used to descramble the broadcast channel.

11. An apparatus for receiving synchronization signals in wireless communications, comprising:
   means for receiving a block of synchronization signals from a base station in a first time interval;
   means for determining a beam identifier and a redundancy version associated with the block of synchronization signals;
   means for receiving a broadcast channel based at least in part on a timing associated with the beam identifier;
   means for descrambling the broadcast channel based at least in part on a scrambling code associated with the redundancy version; and
   means for receiving a second block of synchronization signals from the base station in a second time interval, wherein the second block of synchronization signals corresponds to a different redundancy version and the beam identifier.

12. The apparatus of claim 11, wherein the second time interval is adjacent in time to the first time interval.

13. The apparatus of claim 11, wherein the second time interval is not adjacent in time to the first time interval.

14. The apparatus of claim 11, further comprising:
   means for receiving a second instance of the broadcast channel based at least in part on a second timing associated with the beam identifier;
   means for descrambling the second instance of the broadcast channel based at least in part on the different redundancy version; and
   means for combining the second instance of the broadcast channel with the broadcast channel to obtain associated broadcast channel data.

15. The apparatus of claim 14, wherein a second scrambling code used to descramble the second instance of the broadcast channel is contiguous in a sequence of scrambling codes to a first scrambling code used to descramble the broadcast channel.

16. A non-transitory computer-readable medium, comprising code executable by one or more processors for receiving synchronization signals in wireless communications, the code comprising:
   code for receiving a block of synchronization signals from a base station in a first time interval;
   code for determining a beam identifier and a redundancy version associated with the block of synchronization signals;
   code for receiving a broadcast channel based at least in part on a timing associated with the beam identifier;
   code for descrambling the broadcast channel based at least in part on a scrambling code associated with the redundancy version; and
   code for receiving a second block of synchronization signals from the base station in a second time interval, wherein the second block of synchronization signals corresponds to a different redundancy version and the beam identifier.

17. The non-transitory computer-readable medium of claim 16, wherein the second time interval is adjacent in time to the first time interval.

18. The non-transitory computer-readable medium of claim 16, wherein the second time interval is not adjacent in time to the first time interval.

19. The non-transitory computer-readable medium of claim 16, further comprising:
   code for receiving a second instance of the broadcast channel based at least in part on a second timing associated with the beam identifier;
   code for descrambling the second instance of the broadcast channel based at least in part on the different redundancy version; and
   code for combining the second instance of the broadcast channel with the broadcast channel to obtain associated broadcast channel data.

20. The non-transitory computer-readable medium of claim 19, wherein a second scrambling code used to descramble the second instance of the broadcast channel is contiguous in a sequence of scrambling codes to a first scrambling code used to descramble the broadcast channel.

* * * * *